United States Patent
Rai et al.

(10) Patent No.: US 9,875,544 B2
(45) Date of Patent: Jan. 23, 2018

(54) REGISTRATION OF FLUOROSCOPIC IMAGES OF THE CHEST AND CORRESPONDING 3D IMAGE DATA BASED ON THE RIBS AND SPINE

(71) Applicant: Broncus Medical inc., San Jose, CA (US)

(72) Inventors: Lav Rai, Sunnyvale, CA (US); Jason David Gibbs, State College, PA (US); Henky Wibowo, Cupertino, CA (US)

(73) Assignee: BRONCUS MEDICAL INC., San Jose, CA (US)

( * ) Notice: Subject to any disclaimer, the term of this patent is extended or adjusted under 35 U.S.C. 154(b) by 40 days.

(21) Appl. No.: 14/910,656

(22) PCT Filed: Aug. 7, 2014

(86) PCT No.: PCT/US2014/050228
§ 371 (c)(1),
(2) Date: Feb. 5, 2016

(87) PCT Pub. No.: WO2015/021327
PCT Pub. Date: Feb. 12, 2015

(65) Prior Publication Data
US 2016/0180529 A1 Jun. 23, 2016

Related U.S. Application Data

(60) Provisional application No. 61/864,480, filed on Aug. 9, 2013.

(51) Int. Cl.
*G06K 9/00* (2006.01)
*G06T 7/00* (2017.01)
(Continued)

(52) U.S. Cl.
CPC .......... *G06T 7/0028* (2013.01); *G06T 7/0012* (2013.01); *G06T 7/33* (2017.01);
(Continued)

(58) Field of Classification Search
CPC .............................. G06T 7/00; A61B 17/00
(Continued)

(56) References Cited

U.S. PATENT DOCUMENTS

| 7,356,367 B2 | 4/2008 | Liang |
| 7,398,116 B2 | 7/2008 | Edwards |

(Continued)

FOREIGN PATENT DOCUMENTS

WO WO2012154786 11/2012

OTHER PUBLICATIONS

"Fast Deformable Registration on the GPU: A CUDA Implementation of Demons" by Pinar Muyan-Ozcelik, 2008.
(Continued)

*Primary Examiner* — Abolfazl Tabatabai
(74) *Attorney, Agent, or Firm* — Convergent Law Group LLP; Rick Batt

(57) ABSTRACT

The present invention is a method to register 3D image data with fluoroscopic images of the chest of a patient. The ribs and spine, which are visible in the fluoroscopic images, are analyzed and a rib signature or cost map is generated. The rib signature or cost map is matched to corresponding structures of the 3D image data of the patient. Registration is evaluated by computing a difference between the fluoroscopic image and a virtual fluoroscopic projected image of the 3D data. Related systems are also described.

23 Claims, 5 Drawing Sheets

(51) Int. Cl.
*G06T 7/33* (2017.01)
*A61B 5/03* (2006.01)

(52) U.S. Cl.
CPC .............. *G06T 2207/10121* (2013.01); *G06T 2207/30008* (2013.01); *G06T 2207/30012* (2013.01)

(58) Field of Classification Search
USPC ......... 382/128–134; 600/407, 410, 411, 427, 600/594
See application file for complete search history.

(56) References Cited

U.S. PATENT DOCUMENTS

| | | | |
|---|---|---|---|
| 7,508,388 B2 | 3/2009 | Barfuss et al. | |
| 7,508,392 B2 | 3/2009 | Barfuss et al. | |
| 7,508,913 B2 | 3/2009 | Boese et al. | |
| 7,555,331 B2 | 6/2009 | Viswanathan | |
| 7,590,442 B2 | 9/2009 | Boese et al. | |
| 7,599,730 B2 | 10/2009 | Hunter et al. | |
| 7,689,019 B2 | 3/2010 | Boese et al. | |
| 7,689,042 B2 | 3/2010 | Brunner et al. | |
| 7,746,203 B2 | 6/2010 | Cornwall | |
| 7,756,308 B2* | 7/2010 | Viswanathan | G06K 9/00208 382/128 |
| 7,756,316 B2 | 7/2010 | Odry et al. | |
| 7,756,563 B2 | 7/2010 | Higgins | |
| 7,764,984 B2 | 7/2010 | Desmedt et al. | |
| 7,787,932 B2 | 8/2010 | Vilsmeier et al. | |
| 7,801,342 B2 | 9/2010 | Boese et al. | |
| 7,853,305 B2 | 12/2010 | Simon et al. | |
| 7,853,307 B2 | 12/2010 | Edwards et al. | |
| 7,853,308 B2 | 12/2010 | Sauer et al. | |
| 7,889,905 B2 | 2/2011 | Higgins | |
| 8,233,691 B2* | 7/2012 | Barschdorf | G06T 7/33 382/131 |
| 8,331,639 B2 | 12/2012 | Brinks et al. | |
| 8,468,003 B2 | 6/2013 | Gibbs et al. | |
| 8,696,547 B2 | 4/2014 | Wibowo | |
| 9,020,229 B2 | 4/2015 | Rai et al. | |
| 9,078,573 B2* | 7/2015 | Ramanathan | A61B 5/0402 |
| 9,265,468 B2 | 2/2016 | Rai et al. | |
| 9,652,845 B2 | 5/2017 | Rai et al. | |
| 2003/0073901 A1 | 4/2003 | Simon | |
| 2003/0088179 A1 | 5/2003 | Seeley | |
| 2003/0181809 A1 | 9/2003 | Hall et al. | |
| 2005/0010138 A1 | 1/2005 | Mangiardi | |
| 2005/0119561 A1 | 6/2005 | Kienzle | |
| 2005/0135707 A1 | 6/2005 | Turek | |
| 2006/0079759 A1 | 4/2006 | Vaillant | |
| 2006/0155217 A1 | 7/2006 | DeVore | |
| 2007/0015997 A1 | 1/2007 | Higgins | |
| 2007/0142705 A1 | 6/2007 | Ohnishi | |
| 2008/0044074 A1 | 2/2008 | Jerebko | |
| 2008/0183073 A1 | 7/2008 | Higgins | |
| 2008/0243142 A1 | 10/2008 | Gildenberg | |
| 2008/0262342 A1 | 10/2008 | Averbruch | |
| 2008/0269596 A1 | 10/2008 | Revie | |
| 2009/0105579 A1 | 4/2009 | Garibaldi | |
| 2009/0163800 A1 | 6/2009 | Xu | |
| 2009/0253996 A1* | 10/2009 | Lee | A61B 5/0476 600/544 |
| 2010/0030064 A1 | 2/2010 | Averbruch | |
| 2010/0049038 A1 | 2/2010 | Florent | |
| 2010/0128953 A1* | 5/2010 | Ostrovsky-Berman | G06T 7/0032 382/131 |
| 2010/0204547 A1 | 8/2010 | Tanaka | |
| 2010/0228117 A1 | 9/2010 | Hartmann | |
| 2010/0292565 A1 | 11/2010 | Meyer | |
| 2011/0054309 A1 | 3/2011 | Edwards | |
| 2011/0058721 A1 | 3/2011 | Zhang | |
| 2011/0091087 A1 | 4/2011 | Ibarz | |
| 2011/0295111 A1 | 12/2011 | Hansis | |
| 2012/0016269 A1 | 1/2012 | Barrera | |
| 2012/0041291 A1 | 2/2012 | Ferren | |
| 2012/0294498 A1 | 11/2012 | Popovic | |
| 2013/0094742 A1 | 4/2013 | Feilkas | |
| 2014/0021824 A1 | 8/2014 | Rai et al. | |

OTHER PUBLICATIONS

"Flexible camera calibration by viewing a plane from unknown orientations," Z. Zhang, ICCV1999, pp. 666-673.

"Fluoroscopy as an Imaging Means for Computer-Assisted Surgical Navigation," R.Hofstetter, M.Slomczykowski, M.Sati and L.P. Nolte, Computer Aided Surgery, 4:65-76, 1999.

"Fluoroscopy-based Navigation system in Orthopaedic Surgery," Ph.Merloz, J.Troccaz, Vouaillat, Ch.Vasile, J.Tonetti, A.Eid and S.Plaweski, University Department of Orthopaedic and Trauma Surgery; Chu A. Michallon; BP217, 38043 Grenoblecedex 09 France, Equipe GMCAO—Laboratoire TIMC/IMAG (Universite Joseph Fouri er—CNRS).

"A four-step camera calibration procedure with implicit image correction," J. Heikkila and O. Silven, CVPR1997, pp. 1106-1112.

"FTRAC—A robust fluoroscope tracking fiducial," A.Jain, T.Mustafa, Y.Zhou, C.Burdette, G.S.Chirikjian and G.Fichtinger, Med.Phys. 32, Oct. 2005.

"Gradient-Based 2-D/3-D Rigid Registration of Fluoroscopic X-Ray to CT," H.Livyatan, Z.Yaniv and L.Joskowicz, IEEE Transactions on Medical Imaging, vol. 22, No. 11, Nov. 2003.

"An iterative image registration technique with an application to stereo vision," Bruce D. Lucas and Takeo Kanade, Proceedings of the International Joint Conference on Artificial Intelligence, pp. 674-679, 1981.

"Mutual information based CT registration of the lung at exhale and inhale breathing states using thin-plate splines," M.M.Coselmon, J.M.Balter, D.L.McShan and M.L.Kessler, American Association of Physicists in Medicine, Oct. 2004.

"Nonrigid Registration Using Free-Form Deformations: Application to Breast MR Images," Rueckert, Sonoda, Hayes, Hill, Leach and Hawkes, IEEE Transactions on Medical Imaging, vol. 18, No. 8, Aug. 1999.

"A Novel Approach for Distortion Correction for X-ray Image Intensifiers," D.Soimu, C.Badea, N.Pallikarakis, Dept of Medical Physics, Patras, Greece.

"Optimal Graph—Theoretic Approach to 3D Anatomical Tree Matching," Michael Graham and William Higgins, IEEE International Symposium on Biomedical Imaging (ISBI), pp. 109-112, Apr. 2006.

"An Optimized Spline-Based Registration of a 3D CT to a Set of C-Arm Images," S. Jonic, PThevenaz, G.Zheng, L.P.Nolte and M.Unser, International Journal of Biomedical Imaging, vol. 2006, Feb. 2006, pp. 1-12.

"Performance and Robustness of Automatic Fluoroscopic Image Calibration in a New Computer Assisted Surgery System," P.M. Tate, V.Lachine, L.Fu, H.Croitoru M.Sati, W.Niessen, M.Viergever, MICCAI2001, LNCS2208, pp. 1130-1136, 2001.

"A practical global distortion correction method for an image intensifier based x-ray fluoroscopy system," L.F. Gutierrez, C. Ozturk, E. R. McVeigh, and R. J. Lederman, Medical Physics, Mar. 2008, 35(3), pp. 997-1007.

"Simultaneous Registration with CTFluoro Matching for Spinal Navigation Surgery," Y.Sakai, Y.Matsuyama, H.Yoshihara, H.Nakamura, S.Nakashima and N.Ishiguro, Nagoya J. Med. Sci, 68, pp. 45-52, 2006.

"Three-dimensional computed tomographic reconstruction using a C-arm mounted XRII: Correction of image intensifier distortion," R.Fahrig, M.Moreau, and D.W.Holdsworth, Med. Phys. 24(7): 1097-1106, Jul. 1997.

"Three-dimensional computed tomographic reconstruction using a C-arm mounted XRII: Image-based correction of gantry motion nonidealities, R.Fahrig," P.Moreau and D.W.Holdsworth, 2000 American Association of Physicists in Medicine, Oct. 1999.

PCT International Search Report and Written Opinion of the International Searching Authority, dated Nov. 16, 2012, Application No. PCT/US2012/037026.

(56) References Cited

OTHER PUBLICATIONS

PCT International Preliminary Report on Patentability, dated Nov. 21, 2013, Application No. PCT/US2012/037026.
PCT International Search Report and Written Opinion of the International Searching Authority, dated Apr. 27, 2011, Application No. PCT/US2010/049313.
Extended European Search Report dated Oct. 24, 2014 for European.
"2D-3D Rigid-Body Registration of X-Ray Fluoroscopy and CT Images," L.Zollei, Massachusetts Institute of Technology, Aug 2001—Part 1.
"2D-3D Rigid-Body Registration of X-Ray Fluoroscopy and CT Images," L.Zollei, Massachusetts Institute of Technology, Aug. 2001—Part 2.
"Iterative X-Ray/CT Registration Using Accelerated Volume Rendering," D.A.LaRose, Carnegie-Mellon University, May 2001—Part 1.
"Iterative X-Ray/CT Registration Using Accelerated Volume Rendering," D.A.LaRose, Carnegie-Mellon University, May 2001—Part 2.
"Anatomical image-based rigid registration between fluoroscopic X-ray and CT: methods comparison and experimental results," L.Joskowicz, D.Knaan, H.Livyatan, Z.Yaniv, A.Khoury, R.Mosheiff and M.Liebergall, School of Computer Science and Eng., Hebrew Univ. of Jerusalem, Israel, Orthopedic Surgery Dept., The Hadassah-Hebrew Univ. Medical School, Israel, pp. 1-5.
"Anatomy-Based Registration of CTScan and Intraoperative X-Ray Images for Guiding a Surgical Robot," A.Gueziec and P.Kazanzides, IEEE Transactions on Medical Imaging, vol. 17, No. 5, Oct. 1998.
"An Approach to 2D/3D Registration of a Vertebra in 2D X-ray Flouroscopies with 3D CT Images," J.Weese, T.M.Buzug, C.Lorenz, C.Fassnacht, Philips Research, Technical Systems Hamburg, Germany.
"Automatic fluoroscopic Image Calibration for traumatology intervention guidance," T. Leloup, W. El Kazzi, O. Debeir, F. Schuind, and N. Warzee, Eurocon 2005, pp. 374-377.
"A C-arm calibration method with application to fluoroscopic image-guided procedures," L.Rai, J.Gibbs, and H.Wibowo.
"Computed Tomography—Fluoroscopy Overlay Evaluation During Catheter Ablation of Left Atrial Arrhythmia," Knecht et al., Europace Advance Access, published May 28, 2008.
"Computer Vision: A modern approach," D.A. Forsyth and Jean Ponce, Prentice Hall Professional Technical Reference, 2002—Part 1.
"Computer Vision: A modern approach," D.A. Forsyth and Jean Ponce, Prentice Hall Professional Technical Reference, 2002—Part 2.
"Computer Vision: A modern approach," D.A. Forsyth and Jean Ponce, Prentice Hall Professional Technical Reference, 2002—Part 3.
"Computer Vision: A modern approach," D.A. Forsyth and Jean Ponce, Prentice Hall Professional Technical Reference, 2002—Part 4.

\* cited by examiner

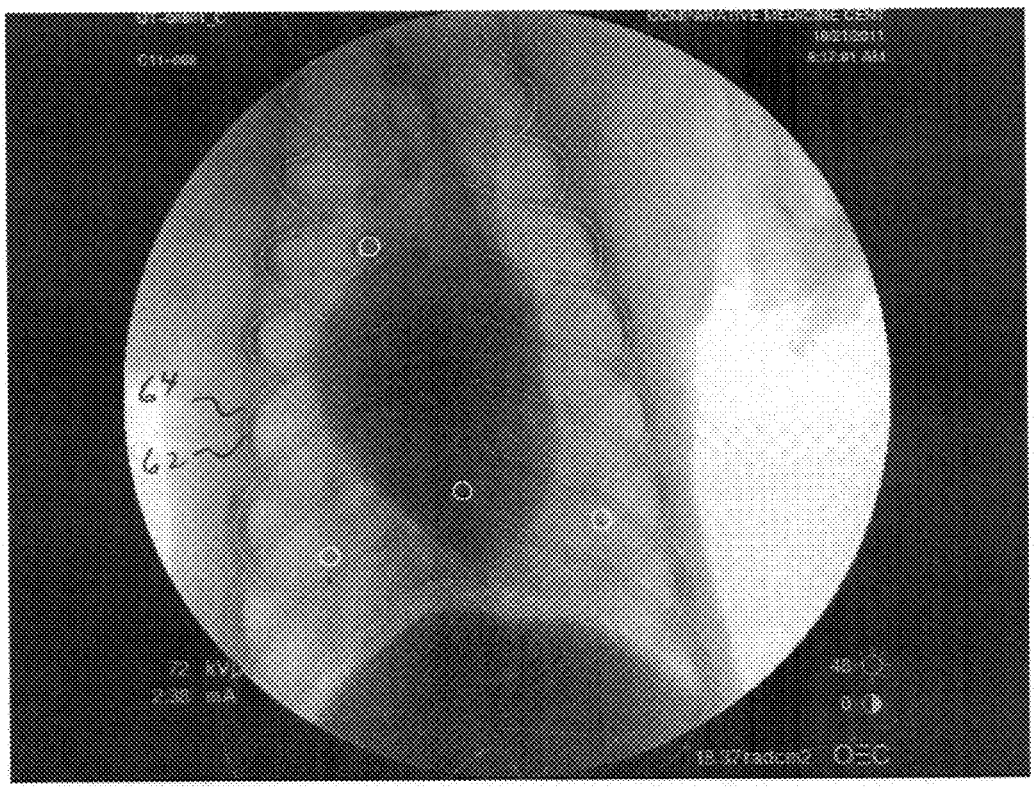
Figure 3

REGISTRATION OF FLUOROSCOPIC IMAGES OF THE CHEST AND CORRESPONDING 3D IMAGE DATA BASED ON THE RIBS AND SPINE

CROSS-REFERENCE TO RELATED APPLICATIONS

The present application is a national phase filing under 35 U.S.C. 371 of International Patent Application No. PCT/US2014/050228, filed Aug. 7, 2014, which claims the benefit of U.S. provisional patent application No. 61/864,480, filed Aug. 9, 2013.

BACKGROUND OF THE INVENTION

Registering a 3D image data of the chest with fluoroscopic images may be carried out by directly comparing virtual fluoroscopic images with real fluoroscopic images. Various anatomical features are used to register the images including but not limited to the heart and diaphragm. The heart and diaphragm, however, have significant size compared to other features and thus can incorrectly bias the registration results towards aligning the heart and diaphragm.

An example of an inaccurate registration 10 suffering from the shortcoming described above is shown in FIG. 1. Projected virtual rib 12 is shown off-set from fluoroscopic rib 14. The off-set arises due to an overemphasis on aligning the diaphragm 16. This bias/error increases due to the difference in breathing level (and heart beat activity) between 3D image and fluoroscopic image.

Accordingly, techniques for registration are desired that avoid the above described shortcomings.

SUMMARY OF THE INVENTION

The description, objects and advantages of the present invention will become apparent from the detailed description to follow, together with the accompanying drawings.

A method and system to register 3D image data with fluoroscopic images of the thorax of a patient is described. The ribs and spine, which are visible in the fluoroscopic images, are analyzed and a rib signature or cost map is generated. The rib signature or cost map is matched to corresponding structures of the 3D image data of the patient. Registration may be evaluated by computing a difference between the fluoroscopic image and a virtual fluoroscopic projected image of the 3D data.

In another embodiment, a method to assist with registering 3D data with 2D fluoroscopic images of a thorax of a patient comprises receiving a 2D fluoroscopic image data set of the thorax including an anatomical structure which is visible under fluoroscopy; and approximating a candidate location of the anatomical structure based on the 2D fluoroscopic image data set. In embodiments, the anatomical structure is one structure selected from the group comprising a rib and spine.

The method may further comprise receiving a 3D data set of the anatomical structure in the thorax; and registering the 3D data set with the 2D fluoroscopic image data set based on the approximating step. The 3D data set may be at least one data selected from the group comprising image data and model data.

In embodiments, the registering may comprise computing a 3D-projected location of the anatomical structure from the 3D data set, and matching the 3D-projected location of the anatomical structure from the 3D data set with the candidate location of the anatomical structure from the approximating step.

In embodiments, the method further comprises, at least in part, manually selecting the candidate location of the anatomical structure in the 2D fluoroscopic image data set.

In embodiments, the approximating step may comprise automatically determining a probability map of rib and spine locations. The probability may be generated by applying a filter which assigns a high cost to certain shapes (e.g., a local strip, bar, band, or stripe).

In embodiments, the method further comprises computing centerlines of the anatomical structure from the 3D data set, and performing the registration step based on the centerlines.

In other embodiments, the method further comprises estimating a motion between the candidate location of the anatomical structure from the approximating step, and the 3D-projected location of the anatomical structure from the 3D data set.

In another embodiment, a fluoroscopy assistance system to assist with registering 3D data with 2D fluoroscopic images of a chest of a patient comprises a computer processor programmed to receive a 2D fluoroscopic image data set of the chest including an anatomical structure which is visible under fluoroscopy; compute a candidate signature representing the anatomical structure based on the 2D fluoroscopic image data; receive a 3D data set of the chest including the anatomical structure; compute a virtual signature based on the 3D data set; match the candidate signature to the virtual signature of the anatomical structure; and register the 3D data set with the 2D fluoroscopic image data set based on the previous match. The anatomical structure is preferably one structure selected from the group comprising a rib and spine.

In embodiments, the 3D data set is at least one data selected from the group comprising image data and model data.

In embodiments, the system further comprises computing a difference between the candidate signature of the anatomical structure and the virtual signature anatomical structure from the 3D data set.

In embodiments, the system comprises automatically determining a probability map of rib and spine locations upon which the candidate signature is based. The probability map may be generated by applying a filter which assigns a high cost to certain shapes.

In embodiments, the virtual signature is a virtual fluoroscopic projected image of the anatomical structure. In embodiments, the virtual signature may comprise centerlines of ribs.

In another embodiment, a method for evaluating a completed registration between a 2D fluoro image of the thorax and a 3D-based fluoro projection image computed from a 3D data set comprises estimating a 2D displacement motion between the 2D fluoro image and the 3D-based fluoro projection image; and computing a final displacement error based on the 2D displacement motion from the estimating step.

The 2D displacement motion may comprise a plurality of 2D displacement values, and the final displacement error is based on weighting at least one displacement value more than another.

The step of estimating the 2D displacement motion may be performed with a block matching algorithm. And a higher weighting is assigned to displacement values associated with a boney structure.

In embodiments, the boney structure comprises ribs and spine. In other embodiments, the boney structure may exclude the diaphragm.

In embodiments, prior to computing the displacement error, a rib-probability map is generated based on the 2D fluoro image of the thorax and approximating a candidate location of the ribs.

In embodiments, the method further comprises detecting patient motion post-registration by receiving a current fluoroscopic image; and computing a current 2D displacement motion between the current fluoroscopic image and the 3D-based fluoro projection image. The method may indicate whether the patient has moved. The step of indicating may be performed by computing whether the current 2D displacement motion exceeds an acceptable range.

BRIEF DESCRIPTION OF THE DRAWINGS

FIG. 3 illustrates a registration between a virtual image arising from the 3D image data with a real fluoroscopic image in accordance with one embodiment of the invention;

DETAILED DESCRIPTION OF THE INVENTION

Figure 1:
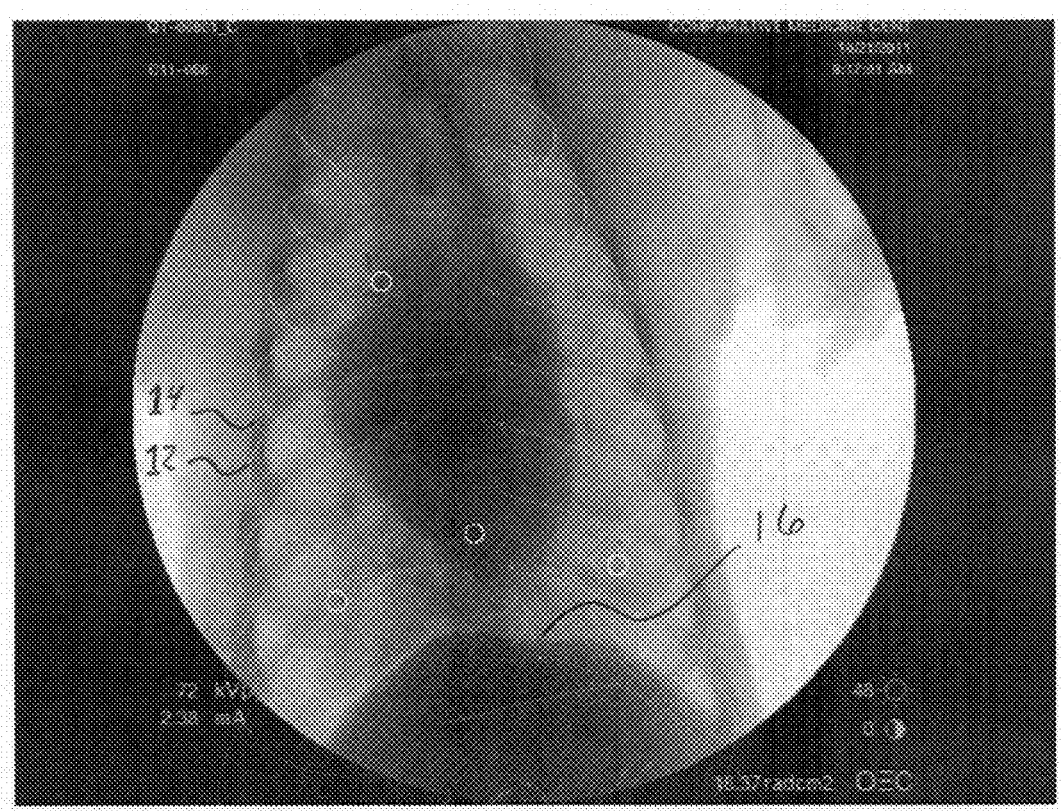
FIG. 1 illustrates an inaccurate registration between a virtual image arising from the 3D image data and a real fluoroscopic image.
Figure 1:

Before the present invention is described in detail, it is to be understood that this invention is not limited to particular variations set forth herein as various changes or modifications may be made to the invention described and equivalents may be substituted without departing from the spirit and scope of the invention. As will be apparent to those of skill in the art upon reading this disclosure, each of the individual embodiments described and illustrated herein has discrete components and features which may be readily separated from or combined with the features of any of the other several embodiments without departing from the scope or spirit of the present invention. In addition, many modifications may be made to adapt a particular situation, material, composition of matter, process, process act(s) or step(s) to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail).

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Last, it is to be appreciated that unless defined otherwise, all technical and scientific terms used herein have the same meaning as commonly understood by one of ordinary skill in the art to which this invention belongs.

As described above in connection with FIG. 1, an overemphasis on aligning the diaphragm leads to an inaccurate registration. Embodiments of the present invention seek to avoid the above described shortcoming by, amongst other things, computing or approximating a candidate location of the ribs and spine, and aligning these structures in both 3D image and fluoroscopic images. In embodiments, this technique is not as susceptible to overemphasis on the diaphragm because the diaphragm is not weighted as high as other visible anatomical structures in the chest. Or, in embodiments, the diaphragm may be excluded altogether.

Figure 2:
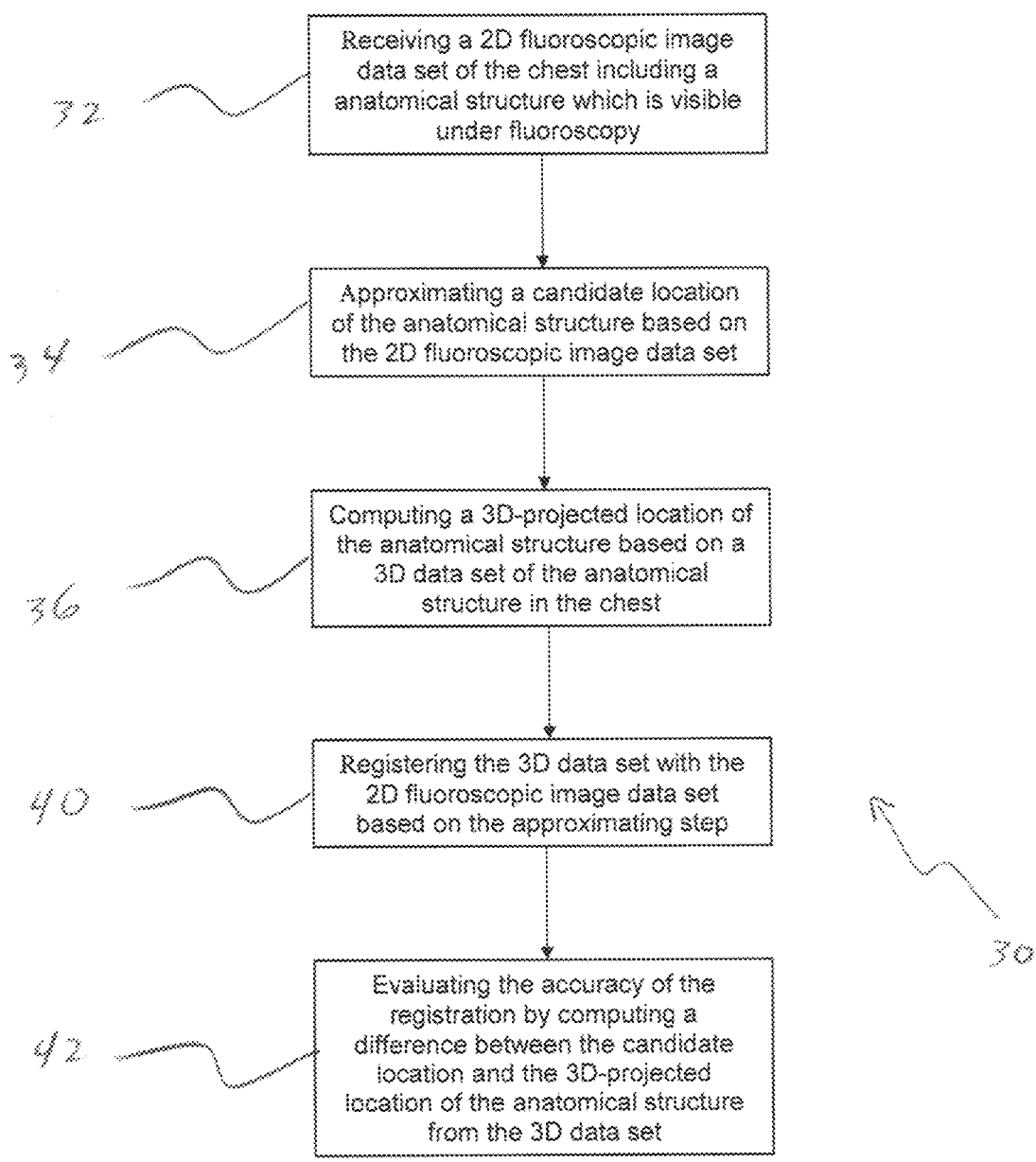
FIG. 2 illustrates a flow diagram of a method for registering 3D image data with a fluoroscopic image.

FIG. 2 is an overview of a method 30 to assist an operator with registering 3D data with 2D fluoroscopic images of a chest of a patient. The method may be performed by a computer or workstation having, amongst other components, a processor programmed with software and a memory device. An exemplary workstation is described in US Patent Publication No. 2012/0289825, filed: May 11, 2011, and entitled "FLUOROSCOPY-BASED SURGICAL DEVICE TRACKING METHOD AND SYSTEM." Results may be shown on a monitor, display, or printout or portable computing device.

With reference to FIG. 2, first step 32 indicates to receive a 2D fluoroscopic image data set of the thorax or chest including an anatomical structure which is visible under fluoroscopy, namely, the ribs or spine. A computer having a memory may be operable to receive the fluoroscopy images from a fluoroscopy unit such as a C-arm fluoroscope (not shown).

Approximating the Bone Structure

Next, step 34 approximates a candidate location (or signature) of the anatomical structure based on the 2D fluoroscopic image data set that is nearly the actual location of the anatomical structure.

Step 34 computes a candidate location (signature, or cost map) of the visible anatomical structure shown in the 2D fluoroscopic image data.

In particular, a filter is applied to weigh certain anatomical structures more than others. The ribs and spine, for example, are weighted more than other structures. In embodiments, the diaphragm and heart are assigned a minimal cost, or excluded altogether.

Figure 4:
FIG. 4 illustrates a rib approximation based on analysis of the fluoroscopic image.

FIG. 4 illustrates a candidate location or signature of the ribs and spine. It is representative of a rib-cost or probability map. A higher cost is placed on the pixels containing ribs and spine than on the other structures. A lower cost is placed on pixels not comprising the ribs and spine.

Figure 5:
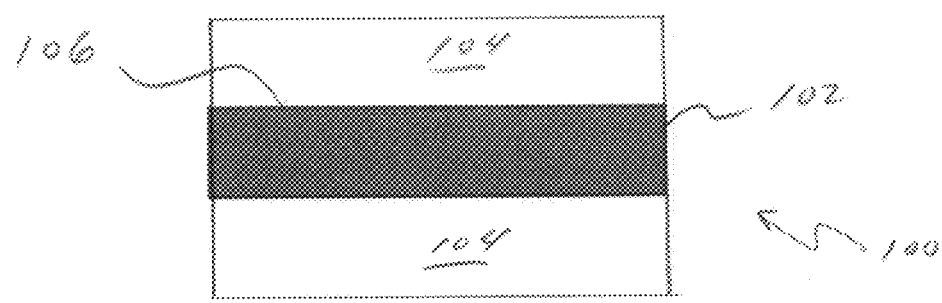
FIG. 5 illustrates an image block containing a stripe.
Figure 6:
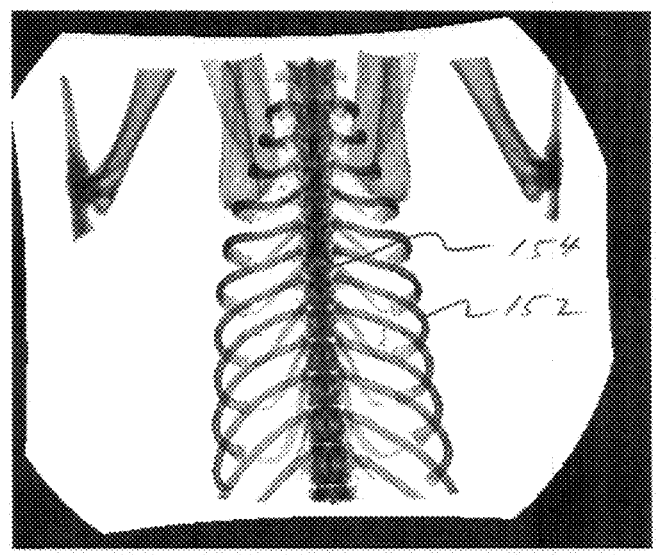
FIG. 6 illustrates a virtual fluoroscopic image of the ribs generated from 3D image data.
Figure 6:

Various filters may be applied to generate the cost or probability map. FIG. 5 is an example of a tool to evaluate and determine costs. In particular, FIG. 5 shows a local stripe 102 defined as a dark stripe surrounded by brighter area 104. In embodiments, the rib-cost for any pixel is generated by applying a customized local filter which generates high cost for local stripes as shown in FIG. 1. This filter and tool serves to highlight the boundaries of the ribs and spine 80 as shown in FIG. 4.

Although the filter described above specifies a stripe or a rectangle, other shapes may be used to capture boundaries of the bone in the fluoroscopic images. A machine-learning based approach can also be used to generate rib-cost image. Additionally, in other embodiments, a light shape may be surrounded by dark area, or vice-versa.

In one embodiment, the rib-cost image contains a maximum-cost value for each pixel. The maximum-cost is computed as the maximum over a range of angle and thickness of a rectangular strip centered at that pixel. The rectangular strip signifies a possible rib-projection section passing through this pixel. In one embodiment, given a thickness and angle of the rectangular strip, the cost at a pixel is given by a weighted combination of border-cost and region cost. The border-cost is computed over pixels along the longer-edge of the rectangular stripe: Border-cost=Laplacian cost+(1−2*AngleBetween(Stripe direction, Image-gradient)/pi), where the Laplacian and Image-gradient are standard operations computed over fluoroscopic image. These operations are described in *Digital Image* Processing by Gonzalez and Woods. The Region-cost is given by:

$$RegionCost=(MeanOutVal-MeanInVal)/(1+stdInVal+stdOutVal)$$

If MeanOutVal>MeanInVal and
RegionCost=0 otherwise,
where (MeanOutVal, stdOutVal) are mean and standard-deviations of pixel intensities in region outside the stripe (e.g., bright area in FIG. 5) and (MeanInVal, stdInVal) are mean and standard-deviations of pixel intensities in region inside the stripe (e.g., dark area in FIG. 5).

Additionally, although the above approximating step is described as automatically performed on a computer processor, in other embodiments, the operator may, at least in part, manually input and select the candidate location (boundaries, bodies, assign cost values) of the anatomical structure in the 2D fluoroscopic image data set.

Compute Virtual Fluoroscopic Projection from 3D Image Data

With reference to FIG. 2, step 36 recites to compute a 3D-projected location of the anatomical structure based on a 3D data set. Available 3D image data from the subject includes without limitation high resolution computed tomography (HRCT) scans, MRI, PET, 3D angiographic, and X-ray data sets. Optionally, Ribs, spine, and bones are segmented out from 3D image and their centerlines may be computed.

In a method, or system, the workstation receives a 3D image file, 3D image data set, or a set of 2D images of the organ from which a 3D model of the organ may be computed. The workstation may communicate with the DICOM, for example, to receive such data sets. An exemplary technique to determine a 3D model of the body organ is disclosed in U.S. Pat. No. 7,756,316 entitled "Method and system for automatic lung segmentation". See also, U.S. Pat. Nos. 7,889,905 and 7,756,563; and Patent Publication No. 2008/0183073 all to Higgins et al. An exemplary technique to segment out the spine is described in "Spine segmentation using articulated shape models" by Klinder et al and to segment ribs is described in "Automatic rib segmentation in CT data" by Staal et al. An exemplary technique to generate projected virtual fluoroscopic images from the 3D data is described in "GPU accelerated generation of digitally reconstructed radiographs for 2D/3D image registration" by Dorgham et al.

A resultant image of a virtual fluoroscopic image generated in accordance with step 36 is shown in FIG. 1. Ribs 152 and spine 154 are visible, having the other tissues removed.

Registering

With reference again to FIG. 2, step 40 registers the 3D data set with the 2D fluoroscopic image data. In particular, the registering step comprises matching the 3D-projected location (virtual fluoroscopic image) from step 36 and the candidate location (signature, or cost map) of the anatomical structure from the approximating step 34.

In embodiments, an alignment cost is computed for any transformation, and the fluoroscopic image can be registered with the 3D data by estimating the optimal transformation which maximizes the alignment cost. This optimal transformation can be determined by an optimizer routine such as Powell optimizer.

One example of computing alignment cost between the virtual fluoroscopic image 36 and rib-cost images from step 34, is: pixel-alignment-cost=rib-cost if bony tissue projects to this pixel in virtual fluoroscopic image; and pixel-alignment cost=0 otherwise.

Using the above described computation for alignment cost, the applicable images may be aligned. An example of an aligned virtual fluoroscopic image and real fluoroscopic image is shown in FIG. 1. Despite the challenges arising from patient breathing and her heart beat motion, the projected virtual ribs 62 are shown accurately aligned with the fluoroscopy counterparts 64.

Centerline Based Registration

In another embodiment, during registration, an optimal transformation between 3D image and fluoroscopic images is computed which aligns rib-centerlines projected from the 3D image with the ribs observed in fluoroscopic images.

For a given transformation, rib centerlines are projected to the fluoroscopic image. A distance map is computed from the rib-projections. The distance map provides an approximate shortest distance to a rib location for each pixel.

In embodiments, an alignment cost is computed as a combination of the distance map and rib cost image from step 34, described above, for all pixels. In embodiments, an alignment cost at a pixel is higher if the distance from closest rib-centerline is small, and the rib-cost is higher at this pixel. One example of alignment cost at a pixel is alignment-cost (x,y)=rib-cost(x,y)/(1+distance-map(x,y)). As described earlier, registration can now be done by an optimizer routine which finds the best transformation which maximizes the alignment cost.

Evaluation

After registration, optional step 42 computes a difference between the candidate location of the anatomical structure from the approximating step, and the 3D-projected location of the anatomical structure from the 3D data set. In a sense, the accuracy of the registration is evaluated.

In embodiments, a method for evaluating a completed registration between a 2D fluoro image of the chest and a 3D-based fluoro projection image computed from a 3D data set comprises estimating a 2D displacement motion between the 2D fluoro image and the 3D-based fluoro projection image. Then, the method comprises the step of computing a final displacement error based on the 2D displacement motion from the estimating step. In embodiments, the values associated with the ribs and spine may be weighted more than other values.

The 2D displacement motion may comprise a plurality of 2D displacement values, and the final displacement error is based on weighting at least one displacement value more than another.

In one embodiment, the 2D displacement motion acceptable range is 0 to 10 mm, preferably less than 3 mm. And, if the final displacement motion error does not fall within an acceptable range, registration is repeated or adjusted until the error falls within the suitable range.

In one embodiment, the step of estimating the 2D displacement motion can be performed with a block matching algorithm which finds the optimal 2D displacement for a pixel (current block) by maximizing the matching cost between the displaced block in virtual image and the current block in fluoroscopic image. The matching cost is computed using normalized-cross-correlation.

In another embodiment, a method may further comprise detecting patient motion post-registration by computing the 2D displacement motion between the current observed fluoroscopic image and the current estimate of the virtual fluoroscopic image estimated by transformation computed during registration. The 3D patient motion makes the 2D displacement motion estimate larger than the pre-motion estimate. In embodiments, excessive patient motion may be flagged if the motion exceeds the 2D displacement motion acceptable range, described above.

Other modifications and variations can be made to the disclosed embodiments without departing from the subject invention.

We claim:

1. A method to assist with registering 3D data with 2D fluoroscopic images of a thorax of a patient comprising the steps of:
   receiving a 2D fluoroscopic image data set of the thorax including an anatomical structure which is visible under fluoroscopy; and
   approximating a candidate location of the anatomical structure based on the 2D fluoroscopic image data set;
   receiving a 3D data set of the anatomical structure in the thorax; and
   registering the 3D data set with the 2D fluoroscopic image data set based on the approximating step;
   wherein the 3D data set is at least one data selected from the group comprising image data and model data; and
   wherein the registering step comprises computing a 3D-projected location of the anatomical structure from the 3D data set, and matching the 3D-projected location of the anatomical structure from the 3D data set with the candidate location of the anatomical structure from the approximating step.

2. The method of claim 1, wherein the anatomical structure is one structure selected from the group comprising a rib and spine.

3. The method of claim 1, further comprising estimating a motion between the candidate location of the anatomical structure from the approximating step, and the 3D-projected location of the anatomical structure from the 3D data set.

4. The method of claim 1, further comprising, at least in part, manually selecting the candidate location of the anatomical structure in the 2D fluoroscopic image data set.

5. The method of claim 1, wherein the approximating step comprises automatically determining a probability map of rib and spine locations.

6. The method of claim 5, wherein the probability is generated by applying a filter which assigns a high cost for local stripes.

7. The method of claim 1, further comprising computing centerlines of the anatomical structure from the 3D data set, and performing the registration step based on the centerlines.

8. A method for evaluating a completed registration between a 2D fluoro image of the thorax and a 3D-based fluoro projection image computed from a 3D data set, the method comprising:
   estimating a 2D displacement motion between the 2D fluoro image and the 3D-based fluoro projection image; and
   computing a final displacement error based on the 2D displacement motion from the estimating step; and
   wherein the 2D displacement motion comprises a plurality of 2D displacement values, and the final displacement error is based on weighting at least one displacement value more than another.

9. The method of claim 8, wherein the step of estimating the 2D displacement motion is performed with a block matching algorithm.

10. The method of claim 8, wherein higher weighting is assigned to displacement values associated with a boney structure.

11. The method of claim 10, wherein the boney structure comprises ribs.

12. The method of claim 11, wherein the boney structure excludes the diaphragm.

13. The method of claim 12, wherein, prior to computing the displacement error, a rib-probability map is generated based on the 2D fluoro image of the thorax and approximating a candidate location of the ribs.

14. The method of claim 8, further comprising detecting patient motion post-registration by:
   receiving a current fluoroscopic image;
   computing a current 2D displacement motion between the current fluoroscopic image and the 3D-based fluoro projection image.

15. The method of claim 14, further comprising indicating whether the patient has moved.

16. The method of claim 15, wherein the step of indicating is performed by computing whether the current 2D displacement motion exceeds an acceptable range.

17. A fluoroscopy assistance system to assist with registering 3D data with 2D fluoroscopic images of a thorax of a patient comprising a computer processor programmed to:
   receive a 2D fluoroscopic image data set of the thorax including an anatomical structure which is visible under fluoroscopy;
   receive a 3D data set of the thorax including the anatomical structure;
   computing a candidate signature representing the anatomical structure based on the 2D fluoroscopic image data and a virtual signature based on the 3D data set;
   register the 3D data set with the 2D fluoroscopic image data set based on the at least one of the candidate signature and the virtual signature; and
   computing a difference between the candidate signature of the anatomical structure and the virtual signature of the anatomical structure from the 3D data set
   wherein the anatomical structure is one structure selected from the group comprising a rib and spine; and
   wherein the 3D data set is at least one data selected from the group comprising image data and model data.

18. The system of claim 17, wherein the virtual signature is a virtual fluoroscopic projected image of the anatomical structure.

19. The system of claim 17, wherein the virtual signature comprises centerlines of ribs.

20. The system of claim 17, comprising computing the candidate signature and the virtual signature wherein the candidate signature is based on determining a probability map of rib and spine locations.

21. The system of claim 20, further comprising computing alignment cost between the virtual signature and the candidate signature.

22. The system of claim 21, wherein the match is based on the maximizing the alignment cost.

23. The system of claim 17, comprising computing the candidate signature and the virtual signature, and matching the candidate signature to the virtual signature.

* * * * *